(12) United States Patent
Windl

(10) Patent No.: US 8,347,226 B2
(45) Date of Patent: Jan. 1, 2013

(54) MENU ENTRIES FOR DROP-DOWN MENUS OF GRAPHIC USER INTERFACES

(75) Inventor: Helmut Windl, Peising (DE)

(73) Assignee: Siemens Aktiengesellschaft, München (DE)

( * ) Notice: Subject to any disclaimer, the term of this patent is extended or adjusted under 35 U.S.C. 154(b) by 1447 days.

(21) Appl. No.: 11/301,815

(22) Filed: Dec. 13, 2005

(65) Prior Publication Data

US 2006/0161864 A1    Jul. 20, 2006

(30) Foreign Application Priority Data

Dec. 13, 2004    (EP) .................................... 04029468

(51) Int. Cl.
*G06F 17/00* (2006.01)

(52) U.S. Cl. ........ 715/810; 715/843; 715/845; 715/853; 715/863

(58) Field of Classification Search ................... 715/810, 715/843, 853, 863, 845
See application file for complete search history.

(56) References Cited

U.S. PATENT DOCUMENTS

| 5,982,302 A | 11/1999 | Ure | |
|---|---|---|---|
| 6,489,978 B1 | 12/2002 | Gong et al. | |
| 6,535,229 B1 | 3/2003 | Kraft | |
| 2002/0054113 A1 | 5/2002 | Conrad et al. | |
| 2002/0063738 A1* | 5/2002 | Chung | 345/810 |
| 2004/0130578 A1* | 7/2004 | Charney | 345/810 |
| 2004/0210523 A1 | 10/2004 | Gains et al. | |
| 2005/0039141 A1* | 2/2005 | Burke et al. | 715/810 |
| 2005/0235207 A1* | 10/2005 | Albrecht et al. | 715/705 |

FOREIGN PATENT DOCUMENTS

EP    1 094 383 A2    4/2001

* cited by examiner

*Primary Examiner* — Andrey Belousov
*Assistant Examiner* — Meseker Takele

(57) ABSTRACT

The invention relates to a method for the input and display of information, data and/or input elements in drop-down menus of graphical user interfaces, the drop-down menus or layered menu levels having a number of menu items of any type, the number of menu items comprising at least a number of menu items which may be selected and deselected in any combination in the form of a check box list and/or mutually exclusive and thus merely switchable menu items in the form of a radio button list, the menu item in the form of a check box list and the menu item in the form of a radio button list respectively comprising its own significant status recognition describing the character of the menu item in the drop-down menu and in the layered menu.

10 Claims, 1 Drawing Sheet ns, icons, etc.
MENU ENTRIES FOR DROP-DOWN MENUS OF GRAPHIC USER INTERFACES

CROSS REFERENCE TO RELATED APPLICATIONS

This application claims priority to the European Application No. EP04029468.8, filed Dec. 13, 2004 which is incorporated by reference herein in its entirety.

FIELD OF INVENTION

The invention relates to a method for the input and display of information, data and/or input elements in drop-down menus of graphical user interfaces.

BACKGROUND OF INVENTION

Graphical user interfaces are used for the interaction between the user and computer and as a communications interface therebetween. They represent a virtual control- and display panel which consists of individual control- and display objects and via which the user transmits commands or information to the computer, the computer in turn signaling back the receipt of these commands and information and/or the response thereto. In an attempt to design the operation of even more complex processes as intuitively as possible and thus to allow rapid navigation through the program, certain standardization procedures have become accepted. These standardization procedures essentially consist in the use of the same or similar control- and display objects, such as for example text boxes, drop-down menus, selection lists, buttons, icons, etc.

Almost all software programs have graphical control windows, software programs being in this sense software applications which run on the operating system of the computer, which require a higher level of interaction between the user and computer and which therefore require a more extensive graphical user interface. The software applications themselves generally run in such control windows, the program windows.

SUMMARY OF INVENTION

Drop-down menus are dialogs within a program window of a software application which, by selecting a menu item, are opened immediately below the selected menu item or immediately adjacent thereto and via which program settings can be directly executed or said drop-down menus can be expanded into further control windows. Menu items are sensitive fields on the menu bar which are located on the upper edge of the program window of the software application and generally consist of a text string, a text character or symbol (icon), the immediate vicinity of the text string, the text character or the symbol being characterized as a sensitive field. The activation and selection of the menu item can be carried out via various selection means, with the computer mouse, trackballs, touch screens or defined or definable key combinations having proved advantageous.

The term 'drop-down menus' should also be understood to mean so-called context-sensitive menus of the same construction which can be opened by moving to any point of the application and whose menu items are arranged together as situation- and context sensitive. Even these context-sensitive menus open in the immediate vicinity of the selection point, either below, above or adjacent thereto.

The term 'drop-down menus' should not be specifically understood to mean universally-known control windows (program-, activation-, selection- or dialog windows) which have a construction which is typical for said control windows (window frames, title bar, dialog box) and have characteristics, such as for example movability, which are typical of windows.

The drop-down menus generally contain a number of menu items whose subjects are related to the menu item or the corresponding context and which in turn are arranged in the form of a single-column table in the dialog of the drop-down menu, can be individually selected and can therefore trigger different actions. The menu items are described by a text entry, in some cases these text entries are provisionally arranged as symbols/icons. Depending on the actions to be triggered, it is possible to differentiate between various types of menu items. Thus menu items, for example, can trigger direct actions, they can open layered menu levels or be used to define and group other menu commands.

Furthermore, menu items can be used as so-called checked menu items to switch various modes on and off. Although checked menu items have other tasks compared to other menu items and are used differently, they cannot be differentiated in drop-down menus from other menu items. They are, however, subjected to almost the same mechanism as other menu items, as regards the activation- and selection behavior. Thus in the selected state the checked menu items are frequently characterized by a check box, whilst in the non-selected state, as with other menu items, they have no identification. This represents a significant disadvantage as an inactive checked menu item in the drop-down menu is not differentiated from other menu items and thus is not, as such, recognizable by the user. In other cases, checked menu items, similarly to other menu items, are characterized by symbols prefixing the text entries, describing the respective menu item. In the case of the activated menu item these symbols have an additional frame, in the deselected state the symbols are represented without an additional frame.

Even this identification does not solve the problem of differentiating between checked menu items and other menu items. On the contrary, with more complex programs and a plurality of symbols, the prefixed symbols are often no longer self-explanatory and the recognition value of these particular symbols is greatly reduced.

As mentioned above, different modes are switched to active and/or inactive mode via checked menu items. If a plurality of menu items of the checked menu item type are located in a drop-down menu, they can either be selected and/or deselected independently of one another and thus have the function of so-called check boxes, or they are mutually exclusive, i.e. only one of these menu items can be active at any one time and thus have the function of so-called radio buttons. In practice, it has proved very disadvantageous not to be aware, beyond any doubt, whether a check box and thus an additional option has been selected or a radio button is in use which, when selected, cancels another set mode.

The response after selecting a menu item is related to the mechanism for the drop-down menu. With the exception of invoking a layered menu level, the drop-down menu closes immediately after selecting the menu item. This is very disadvantageous with regard to checked menu items as the user can no longer recognize whether the desired setting was successful or not. In order to establish this beyond any doubt, it is necessary to open up the drop-down menu again which is time-consuming. The immediate automatic closing of the drop-down menu, in particular when the user, for example, has a plurality of check box items to complete, is disadvantageous as each time the user has to navigate through the drop-down menu from the beginning in order to alter a setting.

Check boxes and radio buttons as such are known in the prior art and are already used in the aforementioned program-, activation-, selection- or dialog windows. The problem of differentiation and automatic closing does not occur here, as in this case individual symbols are generally used to differentiate between check boxes and radio buttons and furthermore the aforementioned windows can only be closed actively by the user. As a result, the user has sufficient time for orientation and checking the inputs.

U.S. Pat. No. 6,489,978 relates to the problems of drop-down menus with checked menu items being automatically closed down and proposes to allow a parameterizable time period to pass which can be retrospectively triggered with settings in the menu, which therefore allows the user the possibility of executing further items in the menu. The drop-down menu can be closed prematurely, by the user clicking outside the menu.

The problem of differentiating between check boxes and radio buttons, in particular in the inactive state is not solved by U.S. Pat. No. 6,489,978.

An object of the present invention is therefore to disclose a device and a method which in a simple manner allows easy operation of checked menu items in drop-down menus in a universal, inexpensive and effective manner.

The object is achieved by a device for setting and displaying information, data and/or input elements on a graphical user interface, in particular on a screen, with (i) at least one menu bar consisting of a number of menu items, at least one drop-down menu being associated with a menu item, the drop-down menu able to contain a number of layered menu levels or (ii) at least one context-sensitive drop-down menu, the context sensitive drop-down menu able to contain a number of layered menu levels, (i) and (ii) comprising a number of menu items in the drop-down menu or menu items in the layered menu levels and the menu items being configured in at least one drop-down menu such that a) at least a number of these menu items are menu items which can be selected and deselected in any combination, so-called check box lists and/or b) at least a number of these menu items are at least mutually exclusive and thus merely switchable menu items, so-called radio buttons, and characterized in that the device comprises interaction means, by means of which the menu item according to a) and b) always has its own significant status change and status recognition describing the character of the menu item in the drop-down menu.

The object is further achieved by a method for setting and displaying information, data and/or input elements via drop-down menus of graphical user interfaces, the drop-down menu or its layered menu levels comprising a number of menu items of any type, the number of menu items comprising at least a number of menu items which may be selected and deselected in any combination, so-called check box lists, and/or mutually exclusive and thus merely switchable menu items, so-called radio button lists and is characterized in that the menu item check box lists and the menu item radio button lists always have their own respective significant status change and status recognition describing the character of the menu item in the drop-down menu.

Check boxes and radio buttons have their own respective identification corresponding to the character of the check box and/or the character of the radio button. As a result, check box- and radio button items are always advantageously differentiated both from one another and from other menu items in the drop-down menu and namely also when no check box or radio button has been selected/activated. After opening the relevant drop-down menu, the user immediately has an overview and thus orientation within the menu is substantially more rapid. Furthermore, with the identification of the type of item, a first evaluation of the items can be carried out. The common practice of checking which, in particular, is widespread amongst users who are less proficient with the software, can substantially be eliminated.

In a preferred embodiment, various symbols can be used as display means for significant status change and status recognition of check box and radio button items. These should be located to the left of the text string identifying the menu item. As a result, the visual aid extended by symbols for a number of other menu items is adopted and continued.

In a further variant the display means are a square frame, which identifies the check box items in the drop-down menu, as such also being understood as a square frame with rounded edges. Due to the familiarity of these symbols from other control windows, the level of recognition is high and misinterpretations are thus excluded. The inactive state of the menu items is represented by a preferably square frame and the active state is characterized by a tick in the frame.

In a further variant, the display means, which represent the significant status change and status recognition of menu items which are mutually exclusive of one another and thus merely switchable menu items, has the form of a selection circle. The inactive state of the menu item is characterized by an empty circle of larger diameter, the active state by an additional, filled-in circle of smaller diameter, which is centered in the circle with the larger diameter. Due to the familiarity of these symbols from other control windows, the level of identification is high and misinterpretations are thus excluded.

A particularly advantageous embodiment is characterized in that the interaction means are characterized such that the status change and status recognition are immediately effective after selection or deselection by the user in the drop-down menu. This allows the user to monitor immediately the success of the interaction with the computer. If the status change is displayed, it is processed by the computer.

A further particularly preferred embodiment is characterized in that the interaction means do not close the drop-down menu after selection or deselection of a menu item which may be selected and deselected in any combination or a mutually exclusive and thus merely switchable menu item.

In this connection it is, above all, advantageous that the results of the interaction with the computer are displayed to the user. The user has time to correct any incorrect inputs immediately. Checking the inputs by further and time-consuming opening of the drop-down menu and its possible layered menu levels is eliminated. The advantage is disclosed in particular when, as with check box items, it is often necessary that a plurality of selection options are to be simultaneously selected. Conventionally, for each individually selected option it has been necessary to navigate through the drop-down menu and the possible layered menu levels and here this is completely eliminated.

In a further advantageous embodiment the interaction means are set such that the user actively initiates the closing of the drop-down menu by acknowledgement. In this case, for example, the acknowledgement can be carried out by the user, such that a selection means are clicked outside the area opened up by the drop-down menu. A further possibility for acknowledgement is, for example, by pressing a specific key or combination of keys.

A particularly advantageous embodiment is characterized in that delay means automatically close the drop-down menu. This embodiment combines the advantages offered by checking the menu items or the possibility of multiple choice in a drop-down menu, with the requirement of efficient operation. In this proposed variant, to close the drop-down menu, it is possible to dispense with an additional mouse click or another form of acknowledgement.

In a further advantageous variant the delay means are not activated as long as the selection means are within the area which is opened up by the drop-down menu. If it has been activated, by the selection means being located outside the area of the drop-down menu, they can therefore be reset before they run, by the user positioning the selection means again within the area of the drop-down menu. The delay means are reactivated by leaving this area. This results very advantageously in the possibility of evaluating and monitoring the items in the check box- or radio button lists and to minimize the number of actions with the selection means.

In a further embodiment, the delay means may be parameterized. In this case, they can be tailored to the changing requirements of the user. The value range for the possibilities of parameterization should advantageously begin with the value zero.

BRIEF DESCRIPTION OF THE DRAWINGS

Exemplary embodiments of the invention are described hereinafter with reference to drawings, in which.

DETAILED DESCRIPTION OF INVENTION

Figure 1:
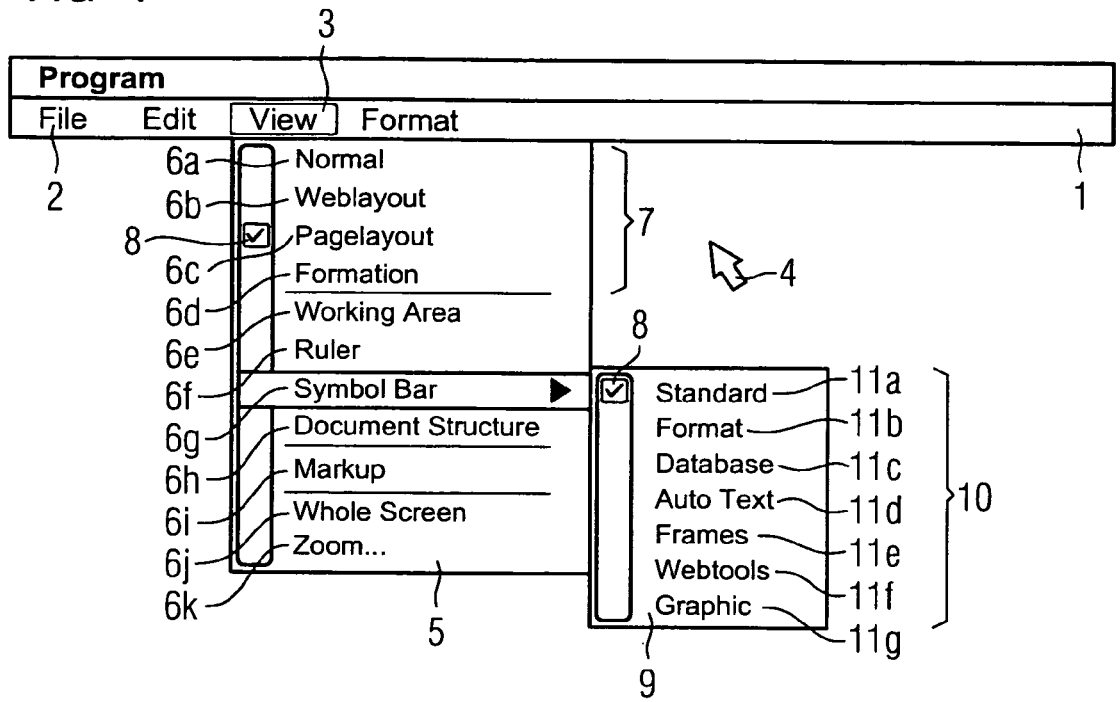
FIG. 1 is an interface with checked menu items of the prior art, by way of example

FIG. 1 shows a menu bar 1 with the menu items 2 which are denoted by the text strings 'file', 'edit', 'view' and 'format'. The respective text strings are surrounded by a sensitive field 3 which can be preselected by positioning the selection means 4 and activated in a further action by the selection means 4. The activation is triggered by a mouse click. Preselection and activation is also possible by means of key inputs, the selection generally being triggered by a first key combination, the activation by a further key input. On activation, a drop-down menu 5 is opened up below the menu item 3. The drop-down menu 5 consists of a number of menu items 6a to 6k, which generally are related to the concept in the menu item 3. In this connection, the menu items 6a to 6d represent checked menu items of a radio button list 7 with mutually exclusive and thus merely switchable menu items which is not at first revealed to the user. The menu items of the radio button list 7 are not characterized by further individual symbols. The activation of a menu item 6a to 6d leads to the deactivation of the previously activated menu item 6a to 6d and to the immediate closure of the drop-down menu 5. In FIG. 1 the item 6a is activated. The activation of the item 6a is displayed via an icon, in FIG. 1 via a square frame with a tick 8.

The menu items 6e, 6f and 6h to 6j also represent checked menu items not revealed to the user, however, in this case, of the check box type. They may be selected or deselected in any combination. The menu items 6e, 6f and 6h to 6j are not characterized by additional individual symbols. Menu item 6f is in the activated state which is shown via the square frame with the tick 8. The activation of one of the menu items 6e, 6f and 6h to 6j leads to the selected modes and to the immediate closure of the drop-down menu 5.

The menu item 6k opens after activation of a further input window and also closes the drop-down menu 5. Menu item 6g opens after positioning the selection means 4 on the layered menu level 9 of the second level. The menu items 11a to 11g in the layered menu level 9 of the drop-down menu 5 represent checked menu items of a continuous check box list 10. After opening the layered menu level 9 the user has neither the information that it refers to checked menu items nor that it is a check box list. The menu items 11a to 11g are not characterized at this point by additional individual symbols.

In the layered menu level 9, the item 11a is active. The selection of a further menu item from the layered menu level 9 leads to the immediate closure thereof and of the drop-down menu 5.

Figure 2:
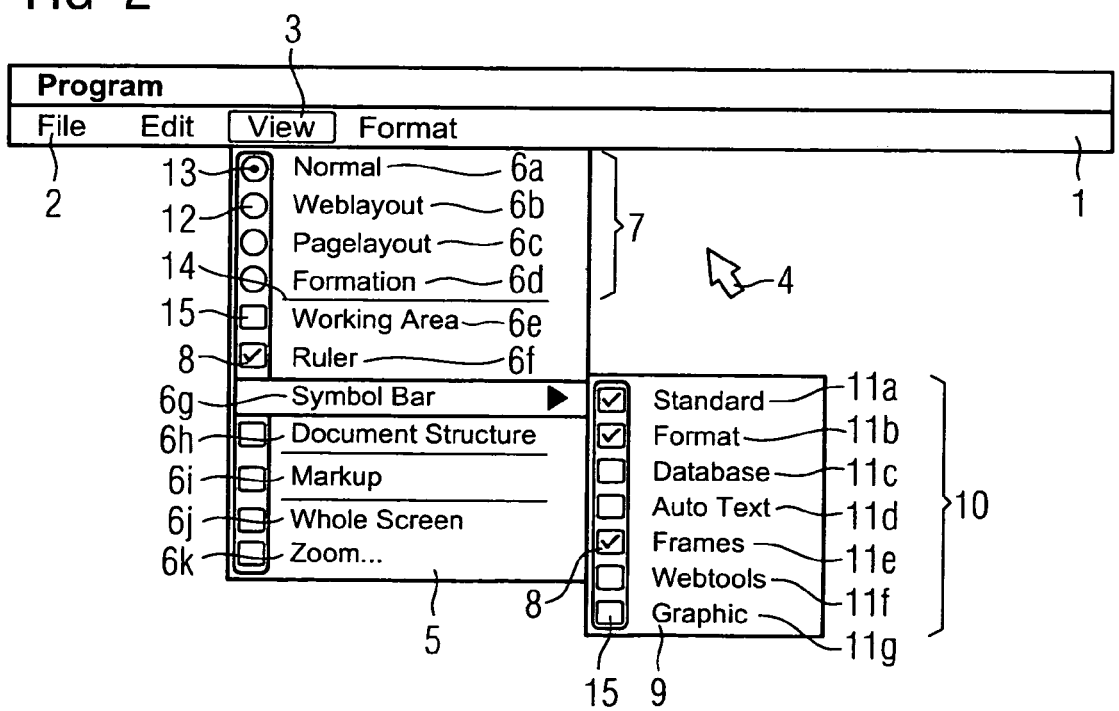
FIG. 2 is an interface with checked menu items, by way of example Mutually corresponding parts are provided with the same reference numerals in all Figures.

FIG. 2 shows the menu bar 1 with the menu items 2 identical to FIG. 1, which in turn are surrounded by a sensitive field 3 and preselected by positioning the selection means 4 and can be activated in a further action by the selection means 4. Upon activation a drop-down menu 5 is opened up below the menu item 3. The drop-down menu consists of the same number of menu items 6a to 6k. The menu items 6a to 6d in turn form the radio button list 7. In contrast to FIG. 1, the menu items 6a to 6d are now shown by prefixed selection circles 12, 13, the empty selection circle 12 characterizing a non-activated menu item and the filled-in selection circle 13 with a filled-in circle of smaller diameter characterizing an activated menu item. As a result, these radio buttons can be identified at any time via their significant symbols corresponding to the character of the radio buttons, as such. In FIG. 2, the menu item 6a is active. If now by means of selection means 4 the menu item 6c is selected, the empty selection circle 12 is replaced by the filled-in selection circle 13. At the same time, the filled-in selection circle 13 would be exchanged in front of the menu item 6a with the empty selection circle 12. In combination with the aforementioned embodiments the drop-down menu 5 would only be closed after acknowledgement—i.e. the conscious action of the user—with the selection means 4 or after completing a delay period, both variants allowing the user the possibility of monitoring the interaction with the computer.

The radio button list 7 ends at the separation mark 14 and subsequent radio buttons are possibly no longer included in the radio button list 7. In this manner, after opening the drop-down menu 5 the user is immediately informed that the items are those of a radio button list, for the menu items 6a to 6d, and which item is currently active.

In the inactive state the menu items 6e, 6f and 6h to 6j contain a square, empty frame 15 prefixed to the text entry and are thus clearly characterized as checked menu items of the check box type. In FIG. 2, the menu item 6f is switched to active. If the user were, for example, now to select the menu item 6i with the selection means 4, the frame 15 would be replaced by the frame with the tick 8. The frame with the tick 8 in front of the menu item 6f remains unaltered by this interaction. By simultaneously creating one of the embodiments in which the drop-down menu does not immediately close, it would be easily possible for the user to check this operation. The same applies to the menu items 11a to 11g of the check box list 10 in the layered menu level 9 which is opened by selecting the menu item 6g. Even in this case the menu items 11a to 11g in the inactive state are shown by a frame 15 and in the active state by a frame with a tick 8.

The invention claimed is:

1. A device for setting and displaying information, data and/or input elements on a graphical user interface, comprising:
    a menu element selected from the group consisting of a first menu element comprising:
    at least one menu bar comprising a plurality of menu items; and
    at least one drop-down menu assigned to at least one of the menu items, the at least one drop-down menu arranged to encompass a designated area of the user interface, the drop-down menu configured to include a plurality of layered first menu levels, and a second menu element comprising:
    at least one context-sensitive drop-down menu, the context-sensitive drop-down menu configured to include a plurality of layered second menu levels, wherein the first respectively second menu element comprises a plurality of first menu items included in the drop-down menu respectively the context-sensitive drop-down menu or a plurality of second menu items included in the layered first respectively second menu levels, wherein at least part of the first respectively second menu items included in the drop-down menu respectively the context-sensitive drop-down menu or in at least one of the layered first respectively second menu levels are configured to be selected and deselected by a user by way of a graphical pointer of a respective input element, wherein at least part of the first respectively second menu items configured to be selected and deselected by the user are mutually exclusive from one another such that the user can only switch between such menu items; and
    a designating unit configured to assign to each first respectively second menu item individual status change and status description markers included in the respective drop-down menu respectively the context-sensitive drop-down menu and in the respective layered first respectively second menu level, the individual status change and status description markers representing a nature of the first respectively second menu items, wherein the designating unit comprises a display for indicating the individual status change and status description markers as graphical symbols wherein first respectively second menu items configured to be selected and deselected are further configured to be selected and deselected in any combination by the user, and a graphical symbol for representing each of said menu items consists of a first empty geometrical representation for indicating a deselected state and further consists of said first geometrical representation having a check mark for indicating a selected state, wherein a graphical symbol for representing each of the mutually exclusive menu items consists of a second empty geometrical representation for indicating a deselected state and further consists of said second geometrical representation being at least filled in part for indicating a selected state, and further wherein a graphical symbol for indicating a link between any two layered menu levels consists of a third geometrical representation, wherein the first geometrical representation, the second geometrical representation, and the third geometrical representation are graphically different from one another to convey to the user graphically distinguishing information, wherein the designating unit is configured to close the drop-down menu upon lapse of a delay time after selecting or deselecting the respective menu item by way of the graphical pointer of the respective input element, wherein the delay time is not activated to run so long as the graphical pointer is placed within the designated area of the drop-down menu, and further wherein, when the delay time has been activated to run by placing the graphical pointer outside the designated area of the drop-down menu, the delay time being resettable by placing again the graphical pointer within the designated area of the drop-down menu.

2. The device according to claim 1, wherein the designating unit is configured to assign the individual status change and status description markers immediately upon selecting or deselecting the respective menu items by the user.

3. The device according to claim 1, wherein the designating unit is configured to keep the drop-down menu respectively context-sensitive drop-down menu open upon selecting or deselecting the respective menu items by the user.

4. The device according to claim 3, wherein the designating unit is configured to close the drop-down menu respectively context-sensitive drop-down menu only upon an acknowledgement input by the user.

5. The device according to claim 1, wherein the drop-down menu respectively context-sensitive drop-down menu is kept open if a selection indicator used for selecting and deselecting the respective menu items is positioned within the drop-down menu respectively context-sensitive drop-down menu after the selecting respectively deselecting.

6. The device according to claim 1, wherein the delay time is adjustable.

7. A method for setting and displaying information, data and/or input elements via drop-down menus of graphical user interfaces, the drop-down menu or layered menu levels of the drop-down menu having a plurality of menu items, the drop-down menu arranged to encompass a designated area of the user interface, the menu items comprising at least one menu element selected from the group consisting of first menu items configured to be selected and deselected by a user in any combination and second menu items configured to be mutually exclusive such that the user can only switch between those menu items, the method comprising:
    assigning to each first respectively second menu item individual status change and status description markers included in the drop-down menu respectively in the layered menu level, the individual status change and status description markers representing a nature of the first respectively second menu items, the method further comprising:
    indicating the individual status change and status description markers as graphical symbols, wherein menu items configured to be selected and deselected in any combination by the user have a graphical symbol consisting of a first empty geometrical representation for indicating a deselected state and further consisting of said first geometrical representation having a check mark for indicating a selected state, wherein mutually exclusive menu items have a graphical symbol consisting of a second empty geometrical representation for indicating a deselected state and further consisting of said second geometrical representation being at least filled in part for indicating a selected state, and further wherein a graphical symbol for indicating a link between any two layered menu levels consists of a third geometrical representation, wherein the first geometrical representation, the second geometrical representation, and the third geometrical representation are graphically different from one another to convey to the user graphically distinguishing information, closing the drop-down menu upon lapse of a delay time after selecting or deselecting the respective menu item by way of a graphical pointer of a respective input element, wherein the delay time is not activated to run so long as the graphical pointer is placed within the designated area of the drop-down menu, and further wherein, when the delay time has been activated to run by placing the graphical pointer outside the designated area of the drop-down menu, the delay time being resettable by placing again the graphical pointer within the designated area of the drop-down menu.

8. The method according to claim 7, wherein the drop-down menu is kept open upon selecting or deselecting the respective menu items by the user.

9. The method according to claim 7, further comprising closing the drop-down menu only upon an acknowledgement input by the user.

10. The method according to claim 7, wherein the drop-down menu is kept open if a selection indicator used for selecting and deselecting the respective menu item is positioned within the drop-down menu after the selecting respectively deselecting.

* * * * *